United States Patent [19]

Stoll

[11] Patent Number: 5,103,967

[45] Date of Patent: Apr. 14, 1992

[54] TRANSITION IMPACT IDLER FOR CONVEYOR BELT

[75] Inventor: Donald L. Stoll, Huntington, W. Va.

[73] Assignee: Richwood Industries, Inc., Huntington, W. Va.

[21] Appl. No.: 691,270

[22] Filed: Apr. 25, 1991

Related U.S. Application Data

[63] Continuation-in-part of Ser. No. 594,758, Oct. 9, 1990, Pat. No. 5,038,924.

[51] Int. Cl.⁵ .............................................. B65G 18/08
[52] U.S. Cl. ..................................... 198/823; 198/841
[58] Field of Search ............ 198/841, 823, 818, 860.1, 198/860.3, 819

[56] References Cited

U.S. PATENT DOCUMENTS

| | | | |
|---|---|---|---|
| 763,207 | 6/1904 | Ridgway | 198/823 X |
| 2,702,115 | 2/1955 | Cunningham | 198/823 X |
| 2,921,668 | 1/1960 | Risse | 198/827 |
| 3,360,105 | 12/1967 | Pelzer | 198/837 X |
| 3,978,976 | 9/1976 | Kamp | 198/819 X |
| 4,215,776 | 8/1980 | Esler | 198/823 |
| 4,280,619 | 7/1981 | Ward et al. | 198/823 |
| 4,696,390 | 9/1987 | Curtis | 198/823 |
| 4,778,046 | 10/1988 | Hashimoto et al. | 198/841 X |
| 4,789,056 | 12/1988 | Bourbeau | 198/841 X |
| 4,793,470 | 12/1988 | Andersson | 198/823 |
| 4,809,844 | 3/1989 | Hashimoto et al. | 198/819 |
| 4,932,516 | 6/1990 | Andersson | 198/823 |
| 5,007,528 | 4/1991 | Hideharu | 198/841 X |

FOREIGN PATENT DOCUMENTS

| | | | |
|---|---|---|---|
| 2416775 | 4/1974 | Fed. Rep. of Germany . | |
| 0087414 | 3/1989 | Japan | 198/819 |
| 458676 | 1/1937 | United Kingdom . | |
| 2188018 | 9/1987 | United Kingdom | 198/823 |
| 2204848 | 11/1988 | United Kingdom | 198/823 |

Primary Examiner—Robert P. Olszewski
Assistant Examiner—Cheryl L. Gastineau
Attorney, Agent, or Firm—Biebel & French

[57] ABSTRACT

An impact slider-type idler for use in the transition section of a bulk material conveyor supports the belt against the impact of material to be conveyed in the transition section and, at the same time, guides the belt from the tail pulley of the conveyor into the desired troughing angle. The slider of this invention employs a plurality of support members extending transversely of the direction of movement of the belt, in side-by-side relation. The support members are formed with T-shaped supports along the upper surface, which supports are inclined to define an increment of change in the troughing angle. Each of the support members carries on the T-shaped supports polymeric segments or blocks which extend transversely of the belt. The angle formed by each section progressively supports the belt between the flat condition as it leaves the tail pulley to a fully troughted position as it exits the transition zone.

7 Claims, 4 Drawing Sheets

TRANSITION IMPACT IDLER FOR CONVEYOR BELT

RELATED APPLICATION

This application is a continuation-in-part of my co-pending application Ser. No. 594,758 filed Oct. 9, 1990, now U.S. Pat. No. 5,038,924 entitled IMPACT SADDLE FOR CONVEYOR BELTS, and assigned to the same assignee as this application.

BACKGROUND OF THE INVENTION

In my co-pending parent application, incorporated herein by reference, there is disclosed and claimed an improved stationary impact saddle for belt-type material conveying systems. The impact saddle described is intended as a direct replacement for conventional impact idler rollers. T-shaped parallel supports extend in transverse relation to the direction of belt movement, and are curved to form an upwardly-facing concavity or curvature which approximates the required troughing angle of the upper run of the conveyor belt. A series of individual low-friction polymeric blocks or segments, positioned in adjacent relation on the supports and transversely of the belt, form upper surfaces which engage and support the lower surface of the belt in the impact zone.

Since the impact saddles of my parent application replace the conventional impact idler, a series of such saddles are usually positioned in side-by-side relation in the impact zone. When the individual blocks or segments are worn, they are replaceable on the saddle supports, by sliding along the T-shaped support members, without having to remove the support members or the frame.

My parent application assumes an impact zone which is spaced somewhat from the tail section of the conveyor belt, in other words, at a location where the troughing angle is already established. There exists, however, conveyor belt installations in which the belt loading, and therefor the impact, takes place in the transition section between the flat or straight tail pulley and the conventional troughing idlers.

Conveyor belt systems use a transition section at the tail piece to form the desired troughing angle in the upper run, since it is not practical to go directly from the flat tail pulley to a troughing idler. Such transition sections commonly use conventional three roll idlers to form up the belt in the transition section, in which the two outside rolls are set at increasing angles, from essentially flat or low angle condition at the tail pulley, to the desired belt troughing angle at end of the transition section. This is ordinarily accomplished by five to seven idlers, spaced about twelve to eighteen inches apart. Where the impact is on the tail piece, impact-type transition roller idlers are commonly used, that is, idlers in which the support rolls are made from an impact absorbing material. A typical example consists of the types HG and HS of Continental Conveyor & Equipment Company, Inc., of Windfield, Ala. 35594. However, roll-type idlers tend to make only line contact with the belt with the result that large areas of the belt are unsupported and subject to damage from falling material.

Using impact saddles of the general type as shown and described in my co-pending application, I have provided a solution to the problem of low-friction impact support at the transition section of a bulk material conveyor belt.

SUMMARY OF THE INVENTION

The invention is directed to a transition impact slider-type idler which provides support for a belt and, at the same time, forms the belt into the desired troughing angle. The transition idler of this invention not only increases the troughing angle from flat to the desired angle over a series of succeeding steeper angled idlers, but each separate idler of this invention is angled from flat in the center to an angle at the opposite edges that corresponds to the angle the belt will take over the length of the transition area. The arrangement provides a smooth low-friction bed for the belt to transverse.

In the practice of my invention, I prefer to use parallel T-shaped supports and individual polymeric blocks or segments carried on the supports, as disclosed in my parent application. I have found that the same blocks can be used, that is, blocks which are formed with a double T-shaped slot for threading onto the corresponding T-shaped frame supports, with the T-shaped frame supports configured to support the segments in a close approximation of a desired transition angle.

It is a characteristic of the conveyor that the lowest or deepest part of the trough formed by the belt is substantially coincident with or level with the off-running side of the tail pulley. Therefore, a longitudinal section through the center of the transition section, that is, in the direction of belt movement, shows that the upper surfaces of the segments form a straight line. The trough is formed by progressively elevating the lateral or opposite sides of the belt, until they form the desired troughing angle with the belt center, which may be from 20° to 30°, and sometimes as much as 45°, to the horizontal.

The total elevation is made by providing an incremental elevation at each of the parallel T-supports of the frames. The tops of the support T's themselves are preferably inclined at a transition angle (at all transverse positions from the belt center) so as to support each polymeric segment with the off-running edge elevated with respect to the on-running edge. In this manner, a smooth and uniform transitional support is provided for the belt, and the belt is then better protected from injury due to the impact of loading at the transition section.

As disclosed in my co-pending application, a particular feature of my invention is the provision of individual impact saddles having polymeric sliding surfaces which may provide a direct substitute for an existing idler roll frame assembly. The spacing, in the direction of belt movement, may be such as to place adjacent support saddles with the blocks or segments in abutment, to form a continuous slider surface, or the saddles could be spaced according to the spacing of the existing idler roll frames, in which case a gap or space could be formed between adjacent belt support surfaces. However, a continuous slide surface is preferred for maximum belt protection.

An important object of this invention is the provision of a transitional impact slider for a belt conveyor.

Another object of the invention is the provision of a saddle-type support with individual low-friction segments positioned in transverse relation to the direction of movement of the belt, in which the segments are supported to form and define a portion of the troughing transition angle leading from the conveyor tail pulley to the final troughing angle of the belt, and to provide for impact support at the transition zone.

3

These and other objects and advantages of the invention will be apparent from the following description, the accompanying drawings and the appended claims.

DESCRIPTION OF PREFERRED EMBODIMENT

Figure 1:
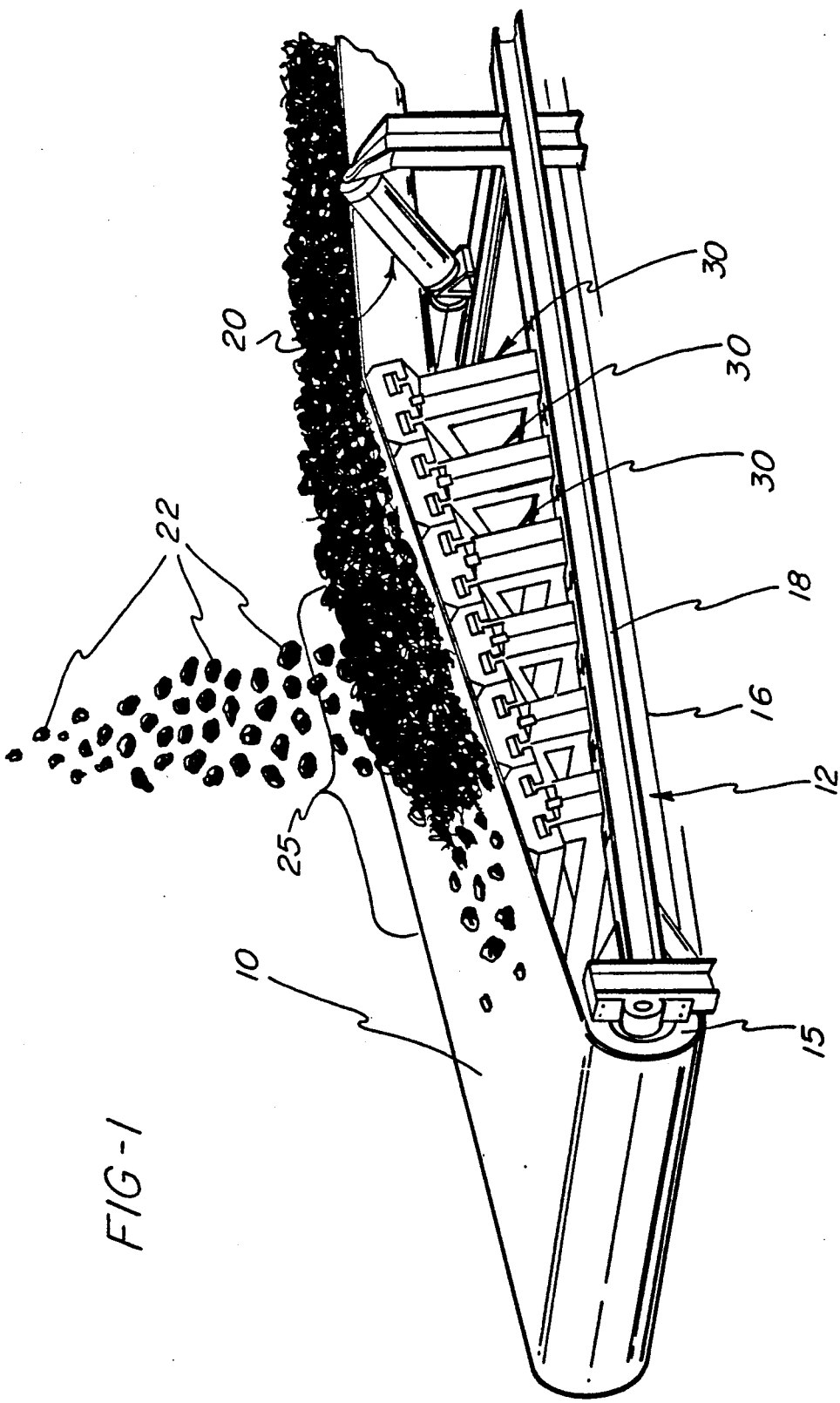
FIG. 1 is a perspective view of the transition end of a belt-type conveyor which is also the load impact region, and illustrating the employment of the transition saddles of this invention for supporting the belt and forming the belt troughing angle.
Figure 2:
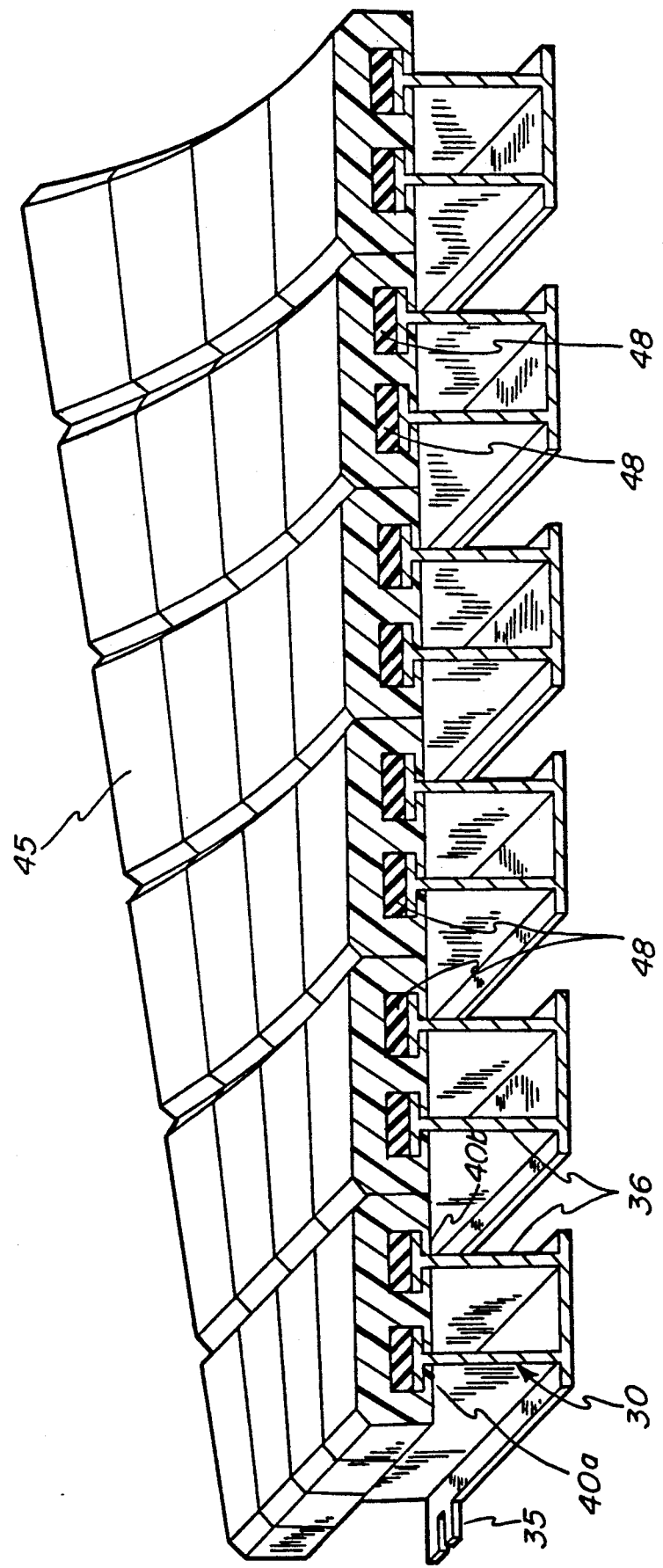
FIG. 2 is a longitudinal sectional view through the transition impact slider-type idler according to my invention with the section being taken through the common low point of the curve.
Figure 3:
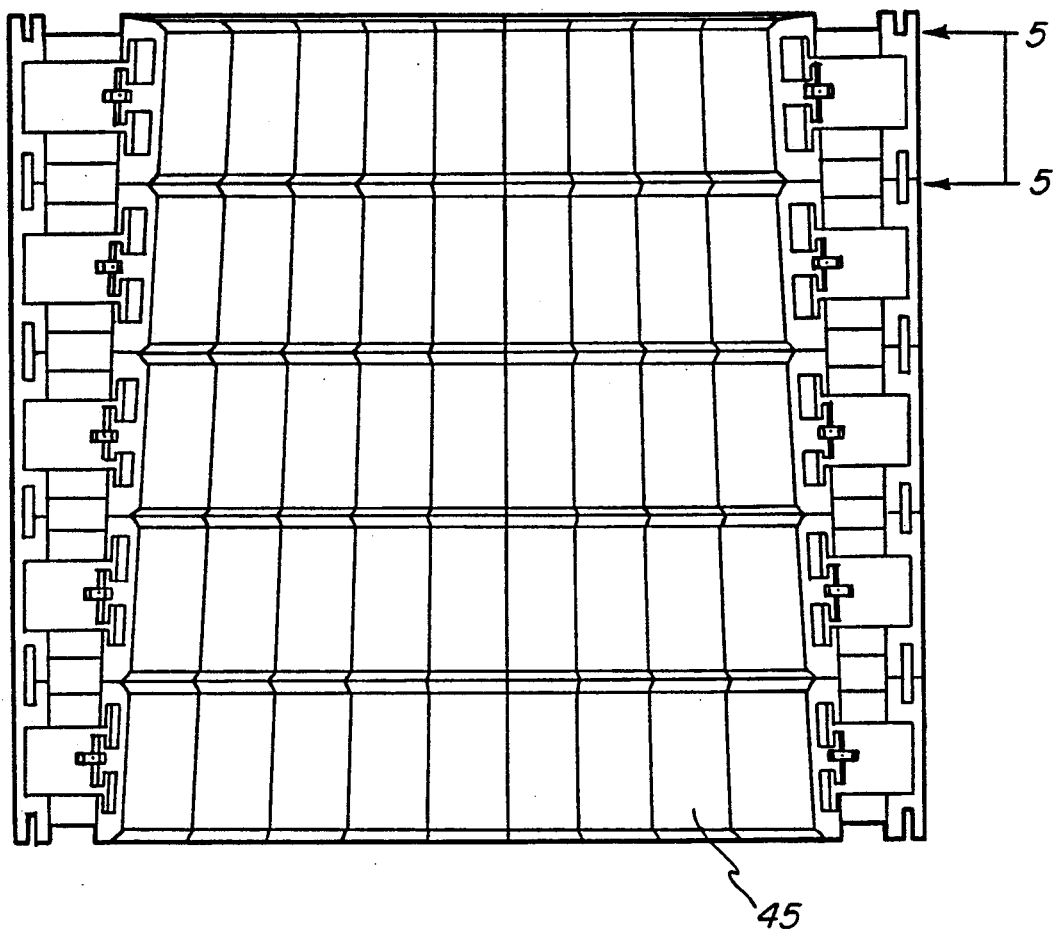
FIG. 3 is a plan view of the transition idler of this invention.
Figure 4:
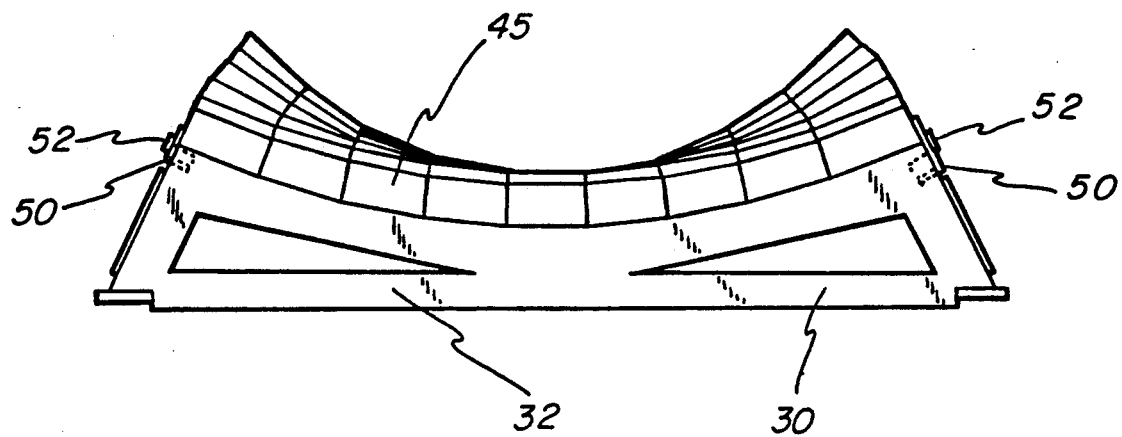
FIG. 4 is an end view of the transitional idler looking along the view line 4—4 of FIG. 3.

With reference to the drawings, which illustrate a preferred embodiment of the invention, a belt-type conveyor for carrying bulk material, such as crushed coal, gravel crushed limestone, or the like, includes a conveyor belt 10. The belt 10 is shown in FIG. 1 and turning at the tail piece 12 about a flat or straight tail pulley 15 from a lower run 16 into an upper run 17. As previously described, it is not practical to form the belt 10 directly into a desired troughing angle without the use of an intermediate or forming section, usually consisting of three-roll type idlers, a typical example being the roll-type idler shown at 20 in FIG. 1.

Such roll-type idlers are quite satisfactory in the transition section where the loading zone in well offset from the tail piece 12. However, FIG. 1 further illustrates a condition where the belt 10 is loaded by bulk material directly in the transition section or zone, identified by the brackets 25, while the belt is being formed from the flat condition at the tail pulley to the final troughing angle at the roll idler 20.

The invention provides an impact slider by which the transition is made, and the belt is supported as in a loading zone. For this purpose, a progression of impact saddles 30 are used, each defining and forming a discrete portion, segment, or part of the total trough angle for the particular belt installation.

Figure 5:
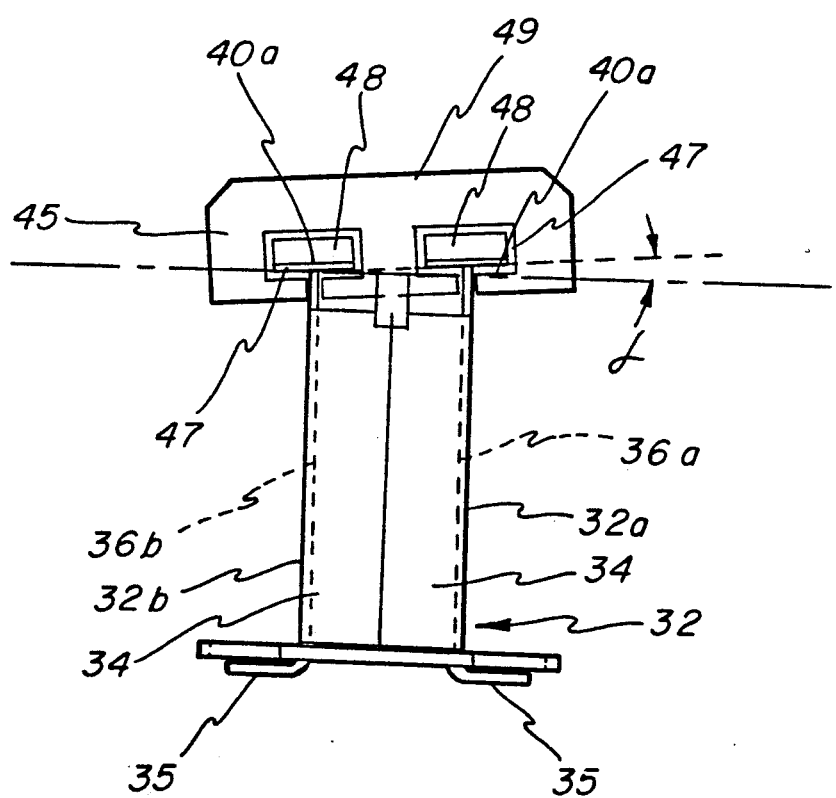
FIG. 5 is a side view of one of the transition saddles looking generally along the view line 5—5 of FIG. 3.

Each saddle 30 has a support frame 32 formed in two halves, namely a right-hand (upstream) support frame section 32a and a left-hand (downstream) support frame section 32b, as best shown by the end view of FIG. 5. The frame sections 32a and 32b are mounted with end flanges 34 in abutting and welded relation, and are formed with outwardly extending feet 35 by which the frame 32 may be secured or attached to a suitable base or support.

The halves 32a and 32b have vertically extending support webs or portions 36 which terminate in a pair of generally parallel, side-by-side T-shaped support members 40a and 40b. The members 40a and 40b have the same elevation and are held normal to the associated web 36 at the transverse center of the belt path, that is, the low point of the saddle. At the opposite ends, however, the T-shaped members are inclined at a common inclination angle $a$ and the member 40a is elevated in relation to the member 40b, so that the T-members are in a straight line to each other.

The T-shaped support members are also curved transversely of the width of the frame 32, with the concavity facing upward. For ease of manufacture, the curve may be in the form of a simple segment of a circle to approximate a troughing angle or an intermediate angle. It is characteristic of the conveyor that the lower-most surface of the belt at the center of the belt, usually remains on a level with the top or off-running side of the pulley 12, while, in the transition zone, the belt lateral sides become progressively elevated until the final troughing angle is obtained. Accordingly, where the curvature is represented as a segment of a circle, it will be seen that the curvature of the supports 40 counting from the pulley 15 toward the roll-type idler, will be represented by decreasing radii in each such support.

The belt running surface is defined by individual polymeric segments or blocks 45 threaded on the pairs of T-shaped supports 40. The blocks 40 may be identical to the corresponding blocks or segments 30 as more fully described in my co-pending application. They are preferably formed of a high molecular weight polyethylene, and have a lower surface which defines a pair of laterally spaced generally T-shaped slots or openings 47 proportioned to receive the supports 40a and 40b. The segments 45 may be isolated by thin pads or blocks 48 of rubber material.

The segments 45 may be identical to each other, and may have planar upper belt-engaging surfaces 49. In use, the segments are threaded onto the supports and are stacked transversely of the belt against each other, so that the upper surfaces approximate a particular curve. Since the support 40a is elevated, with increasing distance from the center, in relation to the support 40b, the blocks are more progressively tilted so that their collective surfaces 49 form an approximation of a surface of revolution with a decreasing diameter with increasing distance from the tail pulley.

Therefor, in use, a plurality of the support frames or saddles 30 are used, such as six as illustrated in FIG. 1, each with a different curvature to accommodate a segment or an increment of the total angle. For example good results have been obtained a 30° troughing angle, for an impact transition zone, by the use of five saddles, the first providing a 5°-7° change, the second a 10°-13° change, the third a 16°-18° change, the fourth a 22°-24° change, and the fifth a 27°-30° change.

When the segments 45 are in place, they may be retained by clips 50 and bolts 52. Worn segments may be replaced by removing the clips, driving on new segments which push the worn segments off the opposite side.

The practice of the invention is largely self-evident from the foregoing description. A suitable progression of saddle supports is chosen to form the belt 10 into the required troughing angle, and positioned in the transition zone 25. Usually, the individual saddles 30 will form a direct substitute or replacement for existing three-roll impact type idlers formally in the zone. However, it is in the scope of the invention to provide a slider for the transition zone in new belt installations.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. An impact saddle for use in a transition section of a belt-type bulk material conveyor, in which the belt moves over a tail pulley and is transitioned from a flat condition to a desired final troughing angle, comprising:

a support frame adapted to be positioned in said belt transition section, said frame having an upper impact segment supporting member extending transversely of the width of said belt, said member being curved to form ends positioned adjacent the lateral sides of said belt which ends are elevated in relation to the transverse middle of said member, said member being formed with laterally spaced generally parallel sides with one of said sides positioned farther from said tail pulley than the other side, said one side being defined by a radius of curvature which is less than the other said side, a plurality of low friction polymeric block-type belt support segments mounted on said supporting member, said segments each having an upper belt-supporting surface, the upper surfaces of said segments being inclined by said member to define a portion of the change in belt angle between the flat condition at said pulley and the final belt troughing angle.

2. The impact saddle of claim 1 in which said segments are formed of high density material.

3. The impact saddle of claim 1 in which said segments are identical and in which said upper surfaces are planar.

4. The impact saddle of claim 1 in which said segment supporting member comprises a pair of side-by-side parallel T-shaped supports one each defining one of said parallel sides, and in which said segments are formed with a pair of T-shaped slots, one each adapted to receive one of said T-shaped supports therein and providing for threading of said segments onto said supports.

5. The impact saddle of claim 4 in which said segments are threaded on said T-shaped supports in end-to-end abutting relation, and in which said upper surfaces collectively form a partial transition angle for said belt.

6. An impact slider-type idler for use in a transition section of a bulk material belt conveyor, for supporting the belt against the impact of a material to be conveyed and, at the same time, guiding the belt from the tail pulley of the conveyor into a desired troughing angle, comprising:

a plurality of support members extending transversely of the direction of movement of said belt and in side-by-side relation, each of said members having means thereon defining an upper transversely curved belt engaging polymeric surface extending the width of said belt, said support members each defining at said polymeric surfaces curvatures of progressively smaller radii with increasing spacing from said tail pulley for forming said belt into said troughing angle, said upper surface defining means further comprising a plurality of substantially identical polymeric blocks, each said block having an upper belt-supporting surface, and said support members having means for supporting said blocks thereon in side-by-side relation transversely of said belt.

7. The impact saddle of claim 6 in which said means for supporting said blocks comprising a pair of T-shaped supports extending transversely of said belt, said supports being inclined at positions spaced transversely of the belt center to define an incremental change in said troughing angle, and said blocks having slot means proportioned to receive said T-shaped supports therein permitting the threading of said blocks onto said supports for a position at one side of said belt.

* * * * *